No. 725,776. PATENTED APR. 21, 1903.
J. ROSENBERGER.
ELECTRIC MOTOR SEWING MACHINE TRANSMITTER.
APPLICATION FILED OCT. 14, 1902.
NO MODEL. 4 SHEETS—SHEET 1.

Witnesses
A. A. de Bonneville
Otto Greenberg

Inventor
J. Rosenberger
By his Attorney
Edward P. Thompson

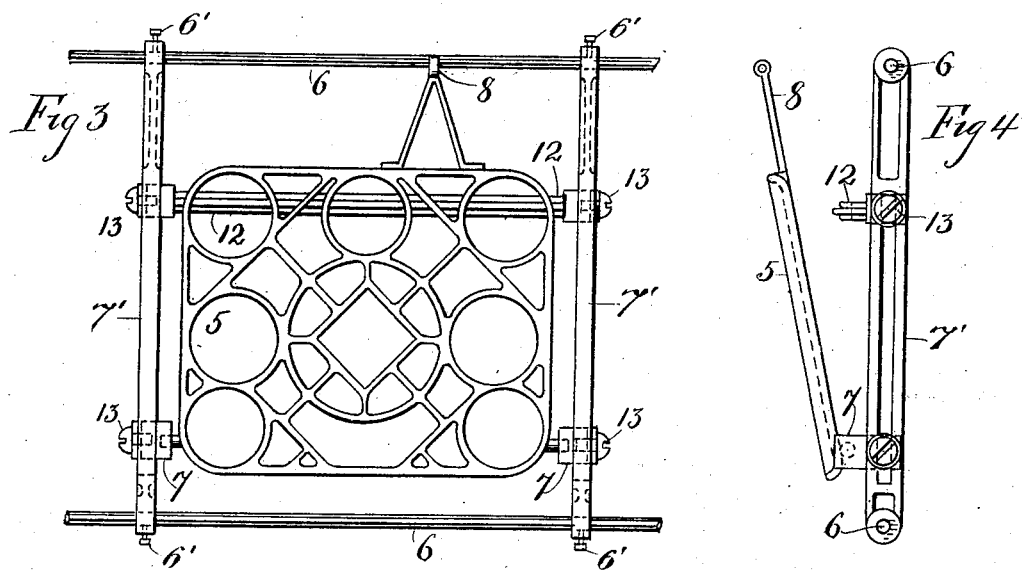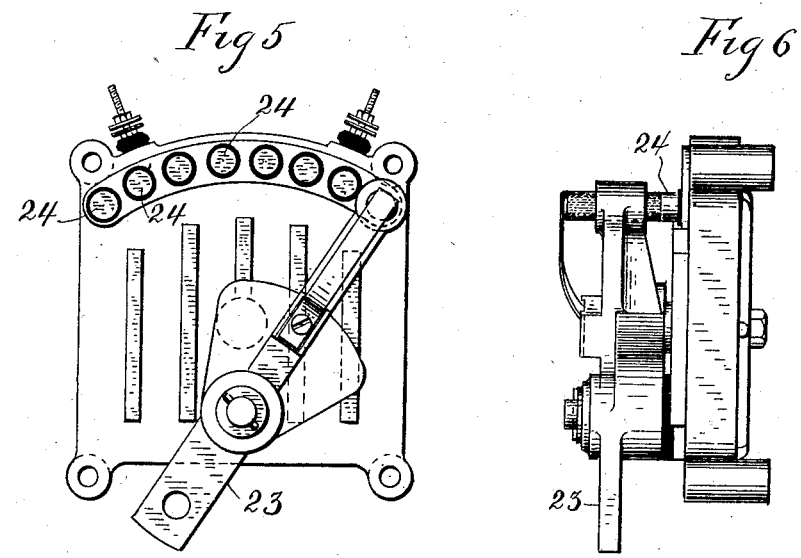

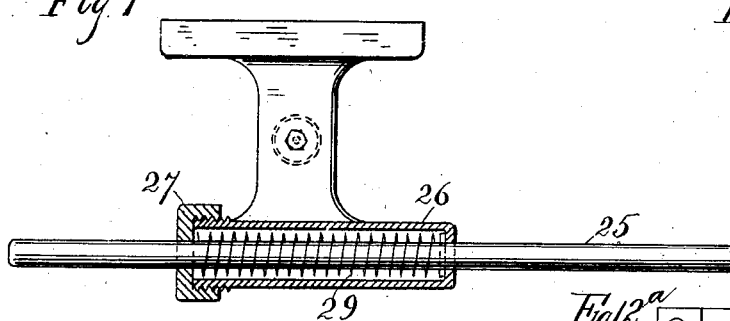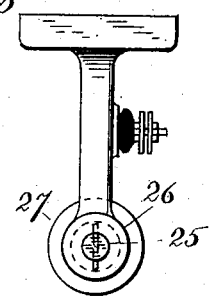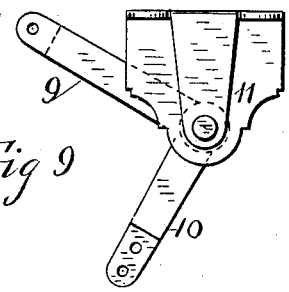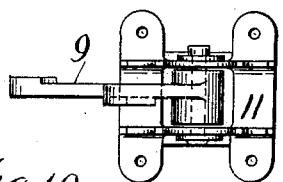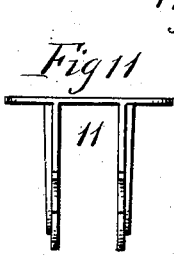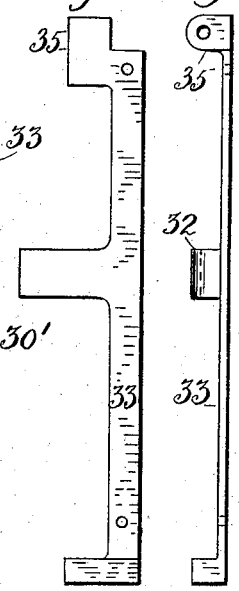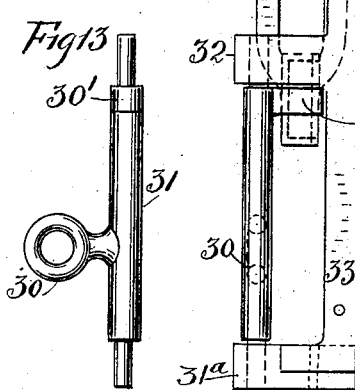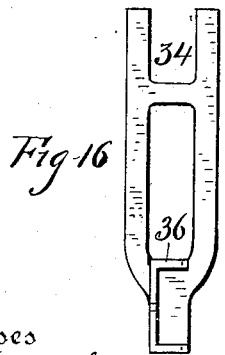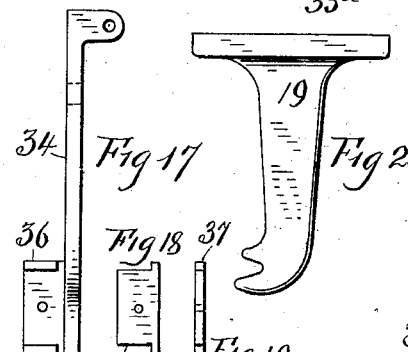

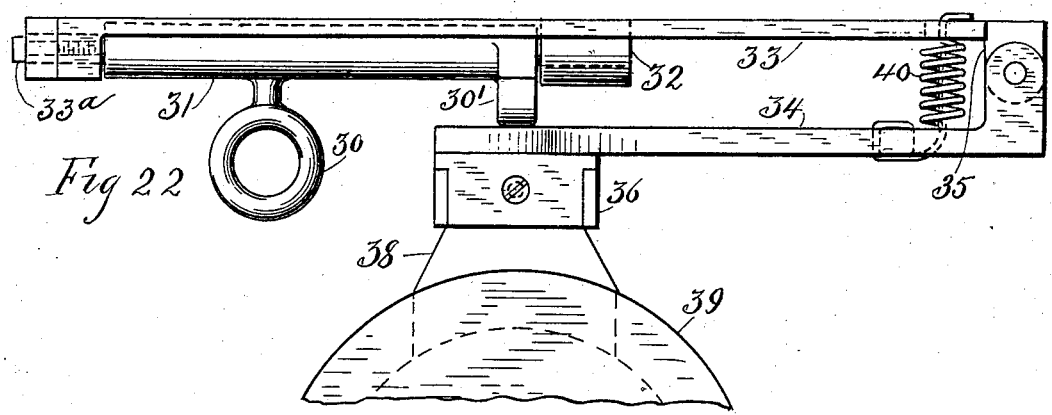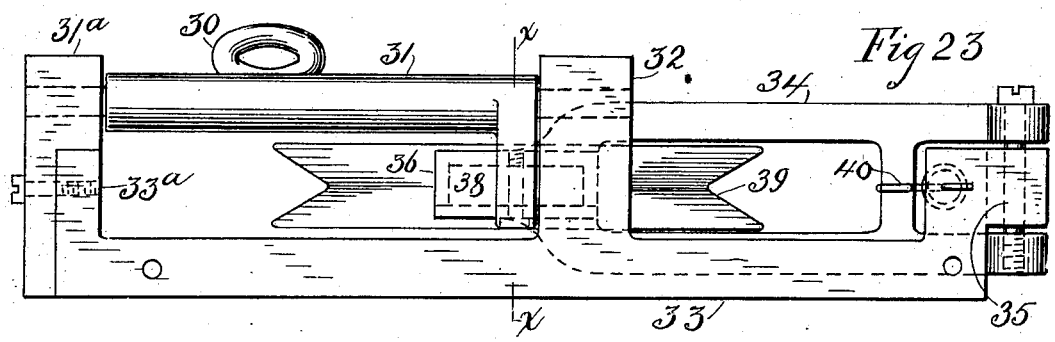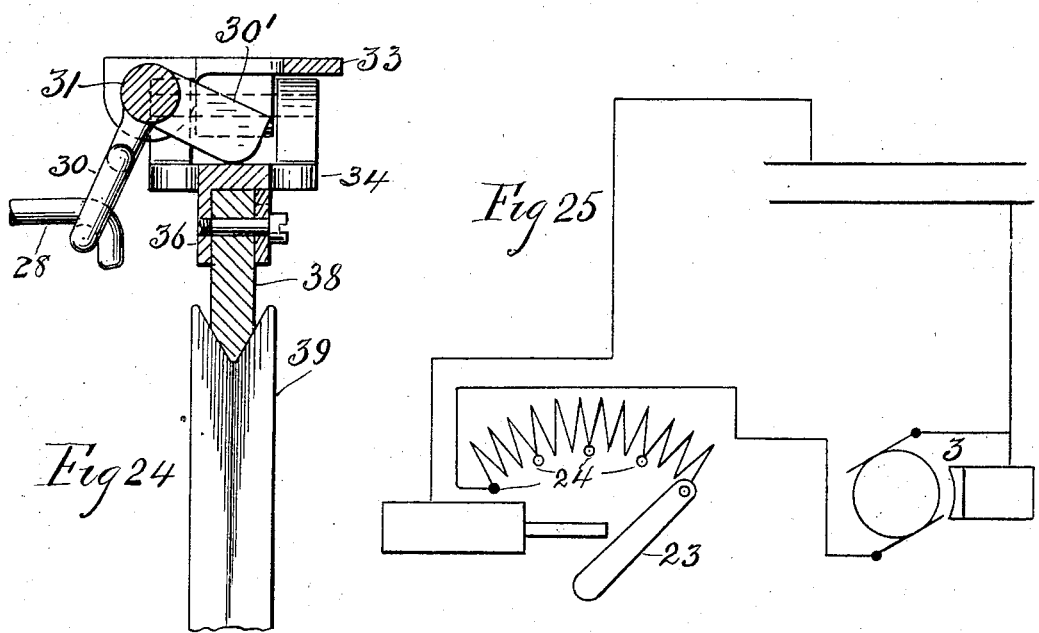

UNITED STATES PATENT OFFICE.

JULIUS ROSENBERGER, OF NEW YORK, N. Y., ASSIGNOR TO THE ROSEMONT ELECTRIC TRANSMITTER COMPANY, OF NEW YORK, N. Y., A CORPORATION OF NEW YORK.

ELECTRIC MOTOR SEWING-MACHINE TRANSMITTER.

SPECIFICATION forming part of Letters Patent No. 725,776, dated April 21, 1903.

Application filed October 14, 1902. Serial No. 127,225. (No model.)

*To all whom it may concern:*

Be it known that I, JULIUS ROSENBERGER, a citizen of the United States of America, and a resident of New York, in the county of New York and State of New York, have invented certain new and useful Improvements in Electric Motor Sewing-Machine Transmitters, of which the following is a specification.

My present invention relates to means for transmitting power from an electric motor to a sewing-machine and to mechanism for applying, regulating, and controlling the electric current in a practical and easy manner, all adapted to be controlled by the pedal, whose downward movement by the action of the operator's foot releases the brake of the motor, switches on the current to a contact-maker and rheostat. Further downward movements of the pedal cut out the rheostat-coils in succession, and thereby regulate the speed of the sewing-machine. By holding the pedal down to its full extent the motor continues to drive the sewing-machine at full speed. By relieving the weight of the foot upon the pedal the same rises and performs the reverse operation of the elements, respectively, directly and indirectly, as hereinafter more clearly pointed out by reference to the drawings.

A leading feature of the general combination is the specific construction of an element whereby the current is not broken at the contacts of the rheostat, which rupture is found to wear them out rapidly by repeated sparking, but at an independent point in the circuit, so that there is no sparking at the contacts when the current is finally cut off by the action of the pedal.

Other features of importance will appear in the detail description and in the claims hereto annexed.

Figure 1:
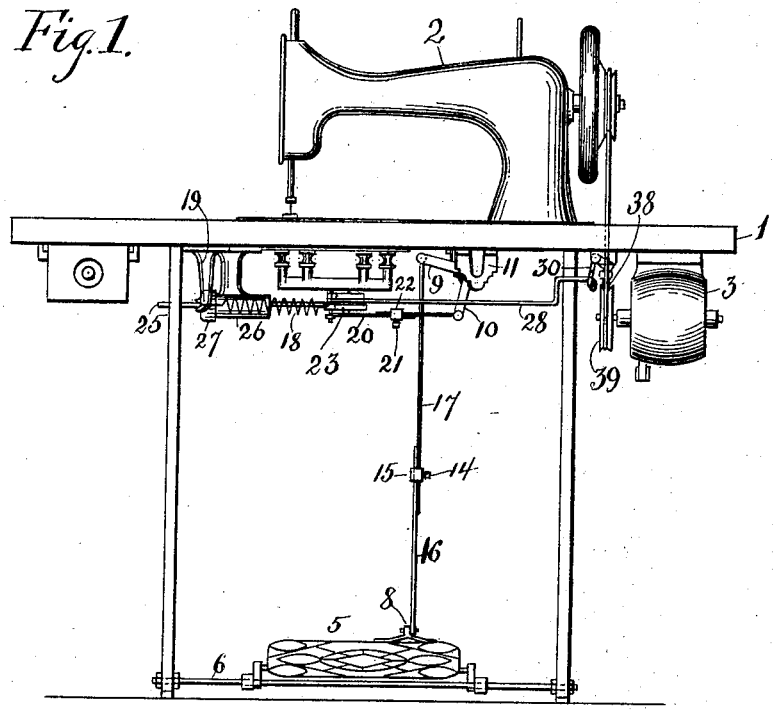
Figure 2:
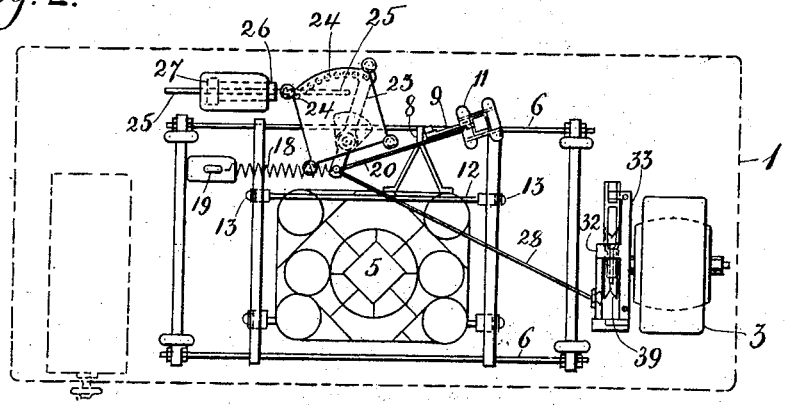

Figure 1 is a general side elevation of an organization to which my invention is applied. All above the table has nothing to do with the invention and is therefore shown only in outline to typify a sewing-machine. The motor and driving mechanism are all shown under the table. Parts not clear on account of the small scale to which this figure is drawn are apparent by reference to other figures, some of which are on a much larger scale. Fig. 2 is a plan of the same machine except that the table is indicated in outline only by a line of dots and dashes. The scale is substantially the same. Fig. 3 is a plan of the pedal and its adjuncts, supports, and adjustable parts. Fig. 4 is a side view of the construction shown in Fig. 3. Figs. 5 and 6 are views of the rheostat similar to those of the pedal. Fig. 7 is a side elevation of the contact-breaker, partly in section and partly external. Fig. 8 is an end view of the device seen in Fig. 7. Figs. 9, 10, and 11 are views at right angles to one another of the crank mechanism for imparting motion from the pedal to the other elements. Figs. 12, 13, 14, 15, 16, 17, 18, and 19 are different views and details of the brake and its adjuncts shown apart and assembled. Fig. 12$^a$ is a view of a bearing 31$^a$, fastened on the frame 33 by the screw 33$^a$. Figs. 20 and 21 are relatively rectangular representations of the hook on post for holding one end of the main retractile spring. Figs. 22 and 23 are different views of the brake mechanism. Fig. 24 is a sectional view of the brake mechanism on the line $x\ x$ of Fig. 23. Fig. 25 shows the electric circuits for distribution of the current.

For a further understanding of the class of machine upon which this invention is an improvement see Patent No. 655,491, of August 7, 1900, granted to Theodore J. Joseph and James J. Ehrenreich.

The table of the machine is numbered 1. On top of the same is the sewing-machine 2. Under the table is the electric motor 3, attached to the under side of the table 1 and provided with a pulley 4 for communicating motion to the sewing-machine 2. The pedal 5 serves to start this motor and to control the current of the same, being pivoted laterally adjustable upon the fixed rods 6, which by means of the cross-bars 7' carry to and fro adjustable pivots or fulcrums 7, whereby the arm 8 may be truly centered under the arm of the bell-crank 9, whose other arm is 10, supported in a bracket 11.

12 is a movable stop, adjustable by means of screws 13 to different positions under the pedal to give the preferred stroke to the crank at 9. This adjustment may be further accomplished by the set-screw 14 and ring 15, connecting the pedal-rod 16 to the crank-rod 17. By varying the length of this compound connecting-rod the rheostat will feed a different maximum current to the motor, and then the stop 12 may be adjusted to positively stop the pedal and relieve the strain upon elements connected up with the crank at 9.

6' represents set-screws by which the pedal may be adjusted and fixed as desired to any position laterally.

18 is the mainspring for returning the pedal 5 and rheostat handle and crank to their normal phases when the foot is raised from the pedal, and this spring is accordingly held at one end by the fixed post 19 and at the other end to an adjustable connecting-rod 20, joining the crank-arm 10, the adjustability being attained by the screw 21 and the ring 22. The downward movement of the pedal 5 subjects this spring 18 to tension.

23 is the handle of a rheostat, whose contacts are 24. In the path of this handle is a spring-pressed movable contact-breaker 25, supported in the bearing 26, having a screw-cap 27 and containing a spring 29, surrounding the contact-breaker 25 and abutting against the cap 27 and having its other end fixed to the contact-breaker 25, whereby the rod will move to the right after being pressed to the left by the handle 23 and then released. In the normal phase of the handle 23 the breaker 25 falls short of the handle 23, so that the current will be broken at the points of contact between the said breaker and said handle, where the sparking will not do any harm to the contacts 24 of the rheostat.

The connecting-rod 28 joins the brake mechanism to the main retractile spring 18 by having a hook or bent portion passing through an eye 30, forming an arm of a spindle 31, rotary in bearings 32, which are located upon a stationary frame 33. Another arm 30' on the spindle 31 bears upon the upper side of a brake-shoe holder 34, which is pivoted to the frame 33 at the bearing 35 and has a frame 36 for retaining a brake-shoe or friction pressure-piece by means of a screw clamping-plate 37. The brake-shoe is at 38. The arms 30 and 30' are radial to the spindle 31 and at ninety degrees to each other. The frame 33 carries the bearing 35 at right angles to the bearings 32, so that the arm 30' may bear against the holder 34 to resist the normal action of the spring 40 upon the brake.

The operation is as follows: All that the operator does is to press his foot upon the pedal 5 with gradually-increasing or sudden pressure for the purpose of pulling downward upon the connecting-rod at 16 and 17. The crank at 9 turns and three effects are produced. First, the brake is released because the rod 28 releases its pressure upon the spindle 30 and permits the spring 40 to remove the brake 38 from the pulley 39. Secondly, the rheostat-handle 23 is turned and soon comes into contact with the V electric terminal 25. The further movement of the pedal 5 downward cuts out more resistances and the sewing-machine 2 runs at an increasing speed. The maximum of this speed may be diminished by shortening the connecting-rod 16 17, as hereinbefore explained. Thirdly, the spring 18 is extended, and when the foot-pressure is relieved all elements are returned to their normal phases by the recoil of the spring 18.

I have constructed several machines exactly as illustrated in the drawings and find that they are satisfactorily operative in the manner set forth.

I claim as my invention—

1. The combination with a machine to be driven by a motor, of a brake for the motor, a rheostat for regulating the current of the motor, a starting-pedal connected up with both the said brake and said rheostat, retractile springs for returning the rheostat, brake and pedal to their normal phases, connecting-rods and a bell-crank connecting said pedal to said rheostat, said rods being adjustable in length, and means for making and breaking the circuit of the motor, said means consisting of a slidable electric terminal located in the path of the handle of the rheostat and normally out of contact therewith.

2. The combination with a machine to be driven by a motor, of a brake for the motor, a rheostat for regulating the current of the motor, a starting-pedal connected up with both the said brake and said rheostat, retractile springs for returning the rheostat, brake and pedal to their normal phases, connecting-rods and a bell-crank connecting said pedal to said rheostat, said rods being adjustable in length, and means for making and breaking the circuit of the motor, said means consisting of a slidable electric terminal located in the path of the handle of the rheostat and normally out of contact therewith, and a spring partly resisting the movement of said terminal for returning the same to its normal position.

3. The combination with a machine to be driven by a motor, of a brake for the motor, a rheostat for regulating the current of the motor, a starting-pedal connected up with both the said brake and said rheostat, retractile springs for returning the rheostat, brake and pedal to their normal phases, connecting-rods and a bell-crank connecting said pedal to said rheostat, said rods being adjustable in length, and means for making and breaking the circuit of the motor, said means consisting of a slidable electric terminal located in the path of the handle of the rheostat and normally out of contact therewith, and a spring partly resisting the movement of said terminal for returning the same to its normal position, bearings for said terminal, a cap on the bearing, said spring for the terminal surrounding the same, fastened at one end, to said terminal and with its other end pressing against said cap.

4. The combination with a machine to be driven by a motor, of a brake for the motor, a rheostat for regulating the current of the motor, a starting-pedal connected up with both the said brake and said rheostat, a retractile spring for returning the rheostat, brake and pedal to their normal phases, connecting-rods and a bell-crank connecting said pedal to said rheostat, said rods being adjustable in length, a frame having a bearing, brake-holder pivoted in said bearing, other bearings on said frame at right angles to the first, a spindle turning in the last-named bearings, arms projecting from said spindle, one bearing against said brake-holder, and the other connected to one of said connecting-rods, and a device controlled by the handle of the rheostat for making and breaking the circuit of the latter in an abnormal position of said handle, said device being other than the terminals or contacts of the resistance-coils of said rheostat.

5. The combination with a motor and machine to be driven by said motor, of a rheostat, a circuit breaker and maker therefor, movable and located in the path of the handle of said rheostat and adapted to close the electric circuit of said rheostat, not until after the said handle has moved a predetermined distance, said breaker forming one terminal of the rheostat and the contacts of the rheostat forming the other terminal.

6. The combination with a motor and machine to be driven by said motor, of a rheostat, a circuit breaker and maker therefor, movable and located in the path of the handle of said rheostat and adapted to close the electric circuit of said rheostat, not until after the said handle has moved a predetermined distance, said breaker forming one terminal of the rheostat and contacts of the rheostat forming the other terminal, said breaker consisting of a spring-pressed and longitudinally-movable rod.

7. The combination with a machine to be driven by a motor, of a brake for the motor, a rheostat for regulating the current of the motor, a starting-pedal connected up with both the said brake and said rheostat, retractile spring for returning the rheostat, brake and pedal to their normal phases, and connecting-rods and a bell-crank connecting said pedal to said rheostat, and means for moving in any horizontal direction and securing the support of said pedal to predetermined positions under said crank.

8. The combination with a machine to be driven by a motor, of a brake for the motor, a rheostat for regulating the current of the motor, a starting-pedal connected up with both the said brake and said rheostat, retractile spring for returning the rheostat, brake and pedal to their normal phases, and connecting-rods and a bell-crank connecting said pedal to said rheostat, rods 6 and cross-bars 7' supporting said pedal, and set-screws holding said pedal to said rods and bars, the pedal being slidable along said rods and bars by loosening said screws.

9. The combination with a machine to be driven by a motor, of a brake for the motor, a rheostat for regulating the current of the motor, a starting-pedal connected up with both the said brake and said rheostat, a retractile spring for returning the rheostat, brake and pedal to their normal phases, connecting-rods and a bell-crank connecting said pedal to said rheostat, and means independent of said connecting-rods for positively limiting the downward movement of said pedal.

10. The combination with a machine to be driven by a motor, of a brake for the motor, a rheostat for regulating the current of the motor, a starting-pedal connected up with both the said brake and said rheostat, a retractile spring for returning the rheostat, brake and pedal to their normal phases, connecting-rods and a bell-crank connecting said pedal to said rheostat, and adjustable means, independent of said connecting-rods, for positively limiting the downward movement of said pedal.

11. The combination with a machine to be driven by a motor, of a brake for the motor, a rheostat for regulating the current of the motor, a starting-pedal connected up with both the said brake and said rheostat, a retractile spring for returning the rheostat, brake and pedal to their normal phases, connecting-rods and a bell-crank connecting said pedal to said rheostat, and stop 12, bars 7', and screws 13, said stop being adjustable along said bars to different positions under said pedal by loosening said screws.

In testimony whereof I have hereunto subscribed my name this 27th day of September, 1902.

JULIUS ROSENBERGER. [L. S.]

Witnesses:
L. E. HICKS,
ANNA R. McCOLE.